(12) United States Patent
Uniacke et al.

(10) Patent No.: US 7,617,302 B1
(45) Date of Patent: Nov. 10, 2009

(54) COMMUNICATION NETWORKS

(75) Inventors: Mark J Uniacke, Potters Bar (GB);
Richard S Borrett, Hitchin (GB);
Robert J Lundie, Pages Lane (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 1138 days.

(21) Appl. No.: 10/008,081

(22) Filed: Nov. 2, 2001

(51) Int. Cl.
*G06F 15/173* (2006.01)
(52) U.S. Cl. .................................... 709/223
(58) Field of Classification Search ............... 709/223, 709/224, 225, 226, 241, 242; 370/254
See application file for complete search history.

(56) References Cited

U.S. PATENT DOCUMENTS

| | | | | |
|---|---|---|---|---|
| 5,727,157 A * | 3/1998 | Orr et al. | ............. | 709/224 |
| 6,611,874 B1 * | 8/2003 | Denecheau et al. | ......... | 709/239 |
| 6,681,248 B1 * | 1/2004 | Sears et al. | ................. | 709/223 |
| 6,697,360 B1 * | 2/2004 | Gai et al. | .................... | 370/389 |
| 6,714,552 B1 * | 3/2004 | Cotter | .......................... | 370/406 |
| 6,721,269 B2 * | 4/2004 | Cao et al. | ..................... | 370/227 |
| 6,957,271 B1 * | 10/2005 | Shimada | ..................... | 709/238 |
| 7,027,448 B2 * | 4/2006 | Feldmann et al. | ........... | 370/401 |
| 7,370,106 B2 * | 5/2008 | Caveney | ..................... | 709/224 |
| 2002/0006123 A1 * | 1/2002 | Angelico et al. | ............ | 370/348 |
| 2002/0019862 A1 * | 2/2002 | Borrett et al. | ............... | 709/221 |
| 2003/0043820 A1 * | 3/2003 | Goringe et al. | ............. | 370/400 |
| 2003/0063562 A1 * | 4/2003 | Sarkinen et al. | ............. | 370/230 |
| 2003/0126195 A1 * | 7/2003 | Reynolds et al. | ............ | 709/203 |
| 2006/0092942 A1 * | 5/2006 | Newson et al. | ............... | 370/392 |

\* cited by examiner

*Primary Examiner*—Andrew Caldwell
*Assistant Examiner*—Benjamin Ailes
(74) *Attorney, Agent, or Firm*—Barnes & Thornburg LLP

(57) ABSTRACT

A communications network comprises a plurality of ports modelled according to a layer protocol, and a network management system adapted to store information describing the physical and logical resources within the network, wherein the network management system is responsive to information describing connectivity in a first one of the layers to derive further information concerning connectivity in another of the layers. The first layer is preferably the closest known layer connectivity to the physical layer and the derived connectivity information applies to successive ones of the upper layers.

18 Claims, 14 Drawing Sheets

STM1 Optical Port    2M Tributary Port    2M Tributary Port cross-connected to STM1 Optical Port using LO VC12 Layer

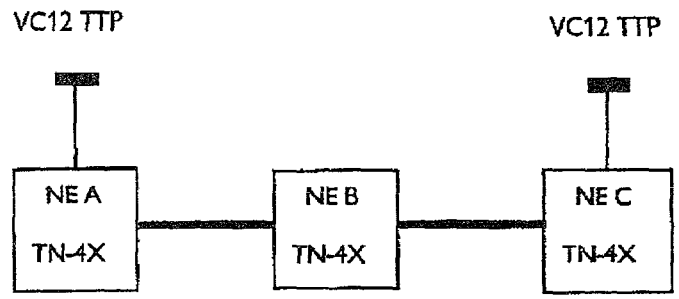
Fig 13
Fig 14
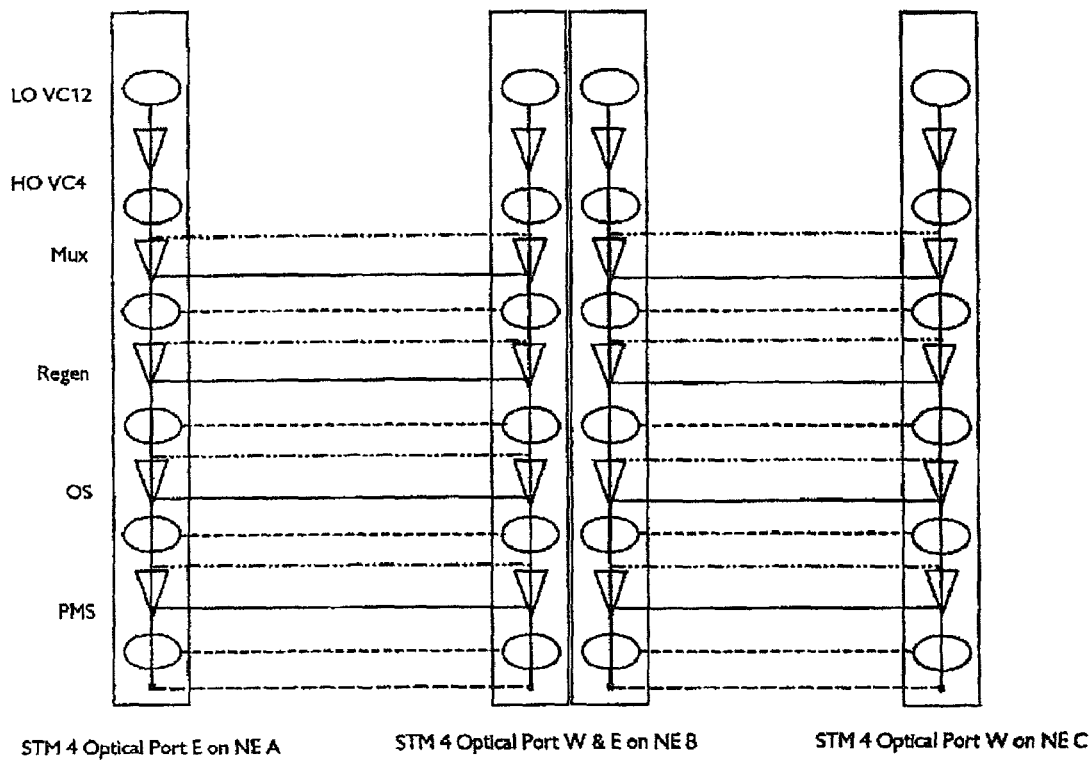

COMMUNICATION NETWORKS

FIELD OF THE INVENTION

The present invention is concerned with communication networks, more specifically with certain control/management aspects of such networks.

BACKGROUND TO THE INVENTION

A conventional communications network, for example a broadband communications network, comprises a plurality of physical resources in the form of network elements, eg switches, cross connects, regenerators, repeaters, transmission links such as fiber optic links or coaxial cable links, operating under control of a plurality of logical resources, eg transport protocols, and local controls associated with individual physical resources. An example of a generic representation of a communications network is illustrated schematically in FIG. 1, in which the physical resources of a core network are located at a plurality of nodes 100 and links 101 distributed over a geographical area.

For a network operator to maintain control of a communications network for its operation, administration and maintenance, a management system is maintained which stores information describing the physical and logical resources within the network. One or more management systems may reside at a centralized location, eg a network controller 102, or different management systems may be situated at a plurality of network controllers at different locations. The management system stores data describing each individual network element in a communications network and has one or more management applications which use the data to manage various aspects of the network, eg operation, administration, and maintenance of the network.

A conventional communications network may comprise of the order of thousands of individual network elements, eg switches, cross connects, regenerators, each of which contains of the order of tens to hundreds of cards, having processors, line terminations, buffers, registers, switch fabrics, etc. each card containing of the order of hundreds of individual components. In general, a conventional communications network may comprise a multitude of different legacy equipment types of different proprietary manufacture, each of which has its own particular internal configuration and offers its own specific capabilities.

International Telecommunications Union (ITU-T) recommendation G.805 of November 1995, (available from International Telecommunication Union, General Secretariat, Sales Service, Place de Nation, CH 1211, Geneva 20, Switzerland), sets out a functional architecture for telecommunications transport networks in a technology independent manner. A generic functional architecture is set out as a basis for a harmonized set of functional architecture recommendations for broadband transport network including asynchronous transfer mode (ATM), synchronous digital hierarchy (SDH) and plesiochronous digital hierarchy (PDH), as well as a corresponding set of recommendations for management, performance analysis and equipment specification for such transport networks.

In general, in known transport networks circuit switched communications are made on an end-to-end basis over a plurality of network entities. In this specification, by circuit switched, it is meant that the network reserves part of its resources for the purpose of supporting an end-to-end communication, for the duration of that communication, whether those resources are used or not.

Referring to FIG. 2, there is illustrated a simple example of a trail of a circuit switched communication over part of a communications transport network. A trans-port network is defined in recommendation G.805 as "the functional resources of the network which conveys user information between locations". In recommendation G.805, a trail is defined as "a transport entity which consists of an associated pair of unidirectional trails capably of simultaneously transferring information in opposite directions between their respective inputs and outputs". A unidirectional trail is defined as a "transport entity" responsible for the transfer of information from the input of a trail termination source to the output of a trail termination sink.

The integrity of the information transfer is monitored. It is formed by combining trail termination functions and a network connection. A transport entity is defined as "an architectural component which transfers information between its inputs and outputs within a layer network. A layer network is defined as "a topological component that includes both transport entities and transport processing functions that describe the generation, transport and termination of a particular characteristic information. A connection is defined as "a transport entity which consists of an associated pair of uni-directional connections capable of simultaneously transferring information in opposite directions between their respective inputs and outputs. A uni-directional connection is defined as "a transport entity which transfers information transparently from input to output".

In FIG. 2, there is illustrated schematically a plurality of transport entities 200, 201, 202, 203, 204 in a communications network comprising network elements eg switches, cross connects, links, supporting an end to end trail between first and second trail termination points 205, 206. The trail is carried over a plurality of connections which connect the transport entities to each other. Connections between transport entities terminate at a plurality of connection termination points (CTP) within the trans-port entities.

The generalized trail as illustrated in FIG. 2, incorporates different trails in different transport protocols. For example, virtual paths and virtual circuits in asynchronous transfer mode (ATM) constitute trails within the meaning of ITU-T Recommendation G.805. ATM cells may be carried within a virtual path within SDH frames over an SDH trail.

Within a layered network, protocol trails occur within layers. Trails can occur at a plurality of different layers. However, each trail is always contained within its own layer. In a large network, comprising tens to hundreds of network elements, management of end-to-end trails poses a highly complex problem and poses difficulties in the practical implementation of setting up and tearing down of trails. The concept of trail management is mentioned in recommendation G.805 in which a trail management process is defined as "configuration of network resources during network operation for the purposes of allocation, reallocation and routing of trails to provide transport to client networks."

Conventionally, for creating a trail across a network it is known for several network operators, at several network controllers controlling different sections of the network, to each set up one or more connections within sections of the network which they control. To achieve a trail over a large number of transport entities, a network operator wishing to set up a trail may need to contact, by means of a telephone call or a fax, other network operators having control of other parts of the network across which a trail may pass, and co-ordinate the setting up of a trail by verbal or fax communication with the other human network operators.

In conventional prior art network management systems, it is known to keep a master database which always overwrites whatever connections exist in the real network under management. Thus, if a network operator makes changes to connections or trails in a network by configuring an individual network element directly, the conventional network management system database will attempt to overwrite any changes made at the network element level, regardless of whether the network operator intended those changes to the network element or not. Further, the known network management systems do not provide an ability to draw configuration and connectivity information from the real network and do not compare such information with the information kept in the master database.

Prior art network management systems either represent network configurations which a network operator plans at a network controller, and implements those configurations irrespective of existing configurations of a network, or provide a network operator with data describing actual network configurations, without taking into account or making provision for a network operator's planned or intended present and future configurations of the network.

In the following discussion, a preferred implementation of the invention is described with reference to synchronous digital hierarchy (SDH) systems. However, it will be understood that the scope of the invention is not restricted to SDH systems but extends over any network of physical and logical resources in the telecommunications or computer networks domains having a management information system, Networks operating asynchronous transfer mode (ATM), synchronous optical network (SONET), integrated service digital network (ISDN) and SDH are specific examples of such networks. However, the invention is not restricted to networks operating these specific protocols.

ITU-T recommendation G.803 deals with the architecture of SDH transport networks and defines an SDH based transport network layered model as illustrated in FIG. 3. The G.803 model uses a functional approach to the description of architectures based on the concept of a number of SDH functional layers and the concept of partitioning within a layer for defining administrative domains and boundaries.

Physically, a conventional SDH network is constructed from a plurality of physical resources, for example network elements such as exchanges, multiplexers, regenerators, and cross connects. The network elements are connected together and provide a transmission media layer, including a section layer comprising multiplex section layer 300, a regenerator section layer 301 and a physical media layer 302. Circuit switched traffic is routed over the physical resources in a circuit layer 303 which is carried by the SDH transport layers.

The SDH multiplexing structure is illustrated schematically in FIG. 4, which also shows synchronous optical network (SONET) multiplexing options and European Telecommunications Standards Institute (ETSI) multiplexing options. The SDH transport layers comprise, in addition to the physical media layer and section layer, a plurality of higher order path layers, for example carried by virtual containers VC-3, VC-4, and a plurality of lower order path layers, for example carried by virtual containers VC-2, VC-3, VC-11, and VC-12.

Data is carried between network elements which are geographically separated by large distances at relatively high data rates, eg 155 Mbits/s. Circuit switched connections, referred to as a circuit layer 301 in recommendation G.803, are transported across the SDH network by encapsulating bit streams comprising the circuit switched connections into different virtual containers (VCs) which are multiplexed together for transmission at higher order bit rates.

Within the physical resources, circuit switched traffic follows paths and trails at various multiplex levels. Connections are terminated at connection termination points (CTPs), and trails are terminated at trail termination points (TFPs) within physical resources. For example, within a communications network, there may be a restricted number of network elements which are capable of processing voice data.

Operations on voice data at a voice level may be performed within those particular network elements. However, to transport traffic data between those network elements, there must be further transmission, such as provided by the SDH virtual container system. Thus, where a voice connection is to be made between geographically disparate network elements A and B, the connection may be routed via intermediate network elements D, E, F, G etc which may be in the VC-12 layer. However, the VC-12 layer itself, to connect between intermediate network elements E, F, may need to be multiplexed into a higher bitrate layer, eg the VC-4 layer.

Referring to FIG. 5, there is illustrated schematically a section of an SDH communications network comprising a plurality of network elements 500-505 operating under control of an element controller 506 and managed by a network controller, referred to herein as network resource manager 507.

The element controller communicates with the plurality of network elements via an operations administration and control channel 509, eg using a conventional network management protocol, for example the known common management information service element (CMISE) protocol. The element controller communicates with the network resource manager 507 via a conventional protocol, for example the transmission control protocol/internet protocol (TCP/IP) over a transmission link 508. The network resource manager 507 implements control of the network by implementing operations, administration and management operations of the network elements, through one or a plurality of element controllers 506.

Referring to FIG. 6, there is illustrated schematically the construction of a typical network element 600, element controller 506 and network resource manager 507. Network element 600, for example a multiplexer or cross connect, comprises a casing or cabinet having one or a plurality of shelves, each shelf containing a plurality of cards 601. The cards contain processors, switch fabrics, line terminations etc depending upon the type of network element, and are connected to each other via a data bus. In the case of an SDH multiplexer, each card may support a number of physical ports. Each port supports a plurality of connections. The network element is provided with a local control system 602 comprising a data processing capability configured to send and receive messages over the CMISE OAM channel 509.

The element controller comprises a workstation 603, for example a Hewlett Packard 9000 series workstation comprising a processor 604, a data storage device 605, a bus 606 linking the processor and data storage device, a graphical user interface 607, and a communications port 608 for communicating with the network element and the network resource manager. Typically, the element controller operates according to a UNIX operating system 609.

The network resource manager 507 similarly may comprise a work station 610, eg Hewlett Packard 9000 series having processor 611, memory 612, bus 613, graphical user interface 614 and communications ports 615 components, operating in accordance with a UNIX operating system 616. The network resource manager and the element controller are configured to communicate with each other using for example TCP/IP link 508.

The network resource manager comprises a managed object base (MOB) 617 containing data describing characteristics and configurations of the network elements under its management. Within the net work resource manager, each network element is represented as a managed object, in accordance with the telecommunications network management network (TMN) architecture of ITU-T recommendation M.3010.

In managed object base 617 physical resources of the network, comprising the transport entities supporting the trails, eg central office switches, multiplexers, regenerators, cross-connects etc are represented as managed objects according to ITU-T recommendation M.3010 (Principals for a Telecommunications Management Network) in known manner. Additionally, individual capabilities and functionalities of those physical resources, for example trail termination points, connection termination points and adaptations within individual physical or logical ports of the physical resources, and the connection limitations and connectivity capabilities of those physical resources are represented within managed object base 617 according to an object representation scheme as disclosed in co-pending U.S. patent application Ser. No. 09/010,387 (corresponding to EP 98306103.7) entitled "Capability Modelling Using Templates in Network Management System".

The network resource manager 507 comprises a trail manager application 620 for managing trails across the network. Management operations controlled by trail manager application 620 are implemented at each of a plurality of element controllers 506 by respective trail management operation controller server 619. In the specific implementation according to the present invention, trail manager application 620 provides a network operator with means for managing trails across a network. In order to enable an operator to manage trails, trail manager application 620 is provided with functionality for:

planning trails across the network;
learning about actual existing trails within the network;
storing data describing existing trails within the network provisioned from planned trails; and
storing data describing whether a planned or provisioned trail is intended within the network.

Within a communications network, although a network operator may create and manage trails using trail management application 620, actual trails may exist within the network which are different to those which the network operator has intended. Trail management application 620 is provided with a graphical user interface (GUI) 614 which enables the network operator to view both the actual trails within the network and the network operator's planned and/or intended trails within the network. For each trail under management of the trail management application 620, there is maintained data representing a status of the trail. The means for representing the status of each trail comprises a state machine which is part of the trail manager application 620, providing data to the trail manager application.

The state machine comprises data processing capability and data storage capability (a database) for maintaining and processing data describing one or more states of each trail under management. In the specific implementation herein, the state machine is physically implemented by configuration of the processing and data storage capabilities of the conventional network management system, for example one or more Hewlett Packard 9000 Series Workstations configured as the element controller, and network resource manager as illustrated in FIG. 6.

Such configurations are implemented by arrangement and allocation of a data storage device and by provision of a set of algorithms to perform data processing operations on data stored on the database. Such arrangements and algorithms may be implemented in a conventional programming language, such as the known C/C++ language as will be appreciated by those skilled in the art. Specific programming options and variations of implementations are numerous and will be readily apparent to the skilled person.

The trail manager 620 obtains data describing specific trail termination points within individual network elements, from managed object base 617, as described in the aforementioned co-pending patent application, and is thereby provided with information concerning available capacity and connection capabilities for supporting trails and connections. The trail manager application 620 obtains data describing the capabilities, including connectivities and restrictions on connectivities of each of the network elements by referencing a set of data templates stored in the managed object base. The templates include templates describing physical or logical ports of a network element, together with connection templates describing possible connectivities of termination points within each physical or logical port of a network element on a layer by layer basis.

A simple example of an aspect of trail management within a network will now be described with reference to FIGS. 7 to 10, which illustrate schematically a representation of an SDH trail traversing three network elements 700, 701, 702. For example, the trail may comprise a VC12 trail. VC12 payloads may enter the trail at trail termination source point 703 and is output at trail termination sink point 704. Trail termination is defined as a "transport processing function" that consists of a co-located trail termination source and sink pair. A trail termination sink is defined as a "transport processing function" which accepts the characteristic information of the layer network at its input, removes the information relating to "trail" monitoring and presents the remaining information at its output. A trail termination source is defined as a "transport processing function" which accepts adapted "characteristic information from a client layer network at its input, adds information to allow the "trail" to be monitored, and presents the characteristic information at its output. The trail termination source can operate without an output from a client layer network. The trail is supported by a plurality of connections 705, 706 between the network elements which enter and leave the network elements at VC12 connection termination points (VC12 CTP) 707-710. The VC12 trail occurs within a VC12 layer, and the connection termination points occur within that layer.

The connection termination points comprise transit points within the trail, between network elements supporting the VC12 layer. Virtual containers traverse the connection termination points without being de-multiplexed. Routing of the VC12 containers is not dependent upon their content, but is dependent upon the path or route taken by the trail across the network elements. At trail termination sink point 704, the VC 12 container payloads may be de-multiplexed, eg to a plurality of 2048 Kbits/s streams. Sub-network connections 711, 712, 713 determine connectivity within the network elements from input connection termination points of the network elements to output connection termination points of the network elements.

In general, each port supporting a trail is represented by a column of layers, as illustrated in FIG. 8. Depending upon the protocol layers supported by the ports, the height of the column may differ from port to port. FIG. 8 illustrates schematically a data representation of part of the VC-12 trail over network elements 700, 701 as stored in the managed object base 617. For each network element, a physical or logical port supporting the trail is represented as an assembly of termination point data templates 900, represented by symbols as illustrated in FIG. 9. Symbol 901 represents a trail termination point, symbol 902 represents an adaptation between a same layer of the trail termination point and a client layer, symbol 903 represents connectivity to a client layer, and symbol 904 represents connectivity to other termination points in the same layer.

In FIG. 8, a trail, eg a VC-12 trail, enters first network element 700 at VC-12 termination point 703 through VC-12 adaptation 800 at a first port 801 of first network element 700. Transport between first and second network elements over link 705 is effected over SDH physical media section 802 to an entry port 803 of second network element 701. Conversion of the physical media section through the SDH protocol layer is represented by a set of data templates representing the physical media section layer 802, optical section layer 805, regenerator section layer 806, STM-N layer 807 and HP-VC4 layer 808 each represented by a separate data template as illustrated in FIG. 9. Internal connections between input and output ports 803, 804 within same network element 701 are made via a VC-12 connection 712.

Referring to FIG. 10, a trail 1000 between trail termination source point 703 and trail termination sink point 704 may be set up by a network operator at network resource manager 506, similarly as described in FIG. 7. The trail manager 620 has a record of the actual trail in the network from data read from managed object base 617, in accordance with the data template representations described with reference to FIGS. 8 and 9. However, in the network, the actual trail may become altered from that created or intended by the network operator, for various reasons. For example, maintenance personnel may be able to take local control of network elements in order to reconfigure connections directly at the network element level, overriding the network resource manager 506 and element controller 507. Thus, in this example in practice an actual trail may be reconfigured, due to local alterations made at second network element 701 so that the VC-12 trail is re-routed to a fourth network element 1001 as shown in FIG. 10. Thus, a new actual trail exists in the network between second trail termination source point 1003, through fourth network element 1001, second network element 701, and third network element 702 to end at trail termination sink point 704. Therefore, whilst a network operator at network resource manager 507 intends a first trail between first and third network elements as shown in FIG. 7, due to external circumstances beyond the network operator's control, eg due to local reconfiguration of second network element 701, an actual trail between fourth and third network elements may be created as illustrated in FIG. 10, which is different to the intended first trail, and overwrites it.

In many cases, the actual trails within the network are the same as trails intended by the network operator. However, discrepancies between intended and actual trails do occur. To provide comprehensive trail management throughout the network, the state machine keeps a record of:

planned trails, eg as input by a network operator at GUI 714 of network resource manager 507; and actual trails within the network, eg created at network resource manager 507 and provisioned in the network, or as a result of events occurring within the network independently of network resource manager 507 and element controller 506.

Planned and actual trails may either be intended or unintended. Usually, the intention of a network operator is that all trails planned at the network resource manager 507 become executed as actual provisioned trails in the network. However, trails which were not planned at the network resource manager may or may not be intended.

In the case of the example of FIG. 10, trail manager application 620 records the actual trail 1002 between fourth and third network elements, the intended trail 1000 between first and third network elements, and the fact that the actual trail between fourth and third network elements may also be intended (since it is a valid trail). Additionally, the state machine may record data representing that each trail identified in FIG. 10 is a valid trail and that they are in conflict: that is to say both trails cannot exist at the same time in the network, because they are mutually exclusive in terms of their demands on the network elements, as well as recording which of the trails was originally planned, and which of the trails has been learnt from interrogation of the network, and may indicate that the trail manager application 620 cannot resolve the discrepancy between the two trails.

The state machine maintains one or more state models for each trail under management of the trail manager 620. The trails may be either actual trails existing within the network or trails intended to be created or having been created by the network operator. A state model comprises a data record of a trail which records a state in which the trail currently resides, ie a condition of the trail.

The data is held in a database containing a list of trails within a network, together with data describing a status and characteristics of the trail according to a state model. For each trail there is maintained data describing the trail in managed object base 620 in the form of one or a set of trail objects. The state machine performs automatic operations on the trail objects, depending upon which one of a plurality of possible states they reside. Further, a network operator may activate operations on the trail objects, eg by typing in commands at graphical user interface 614.

Previous approaches to dealing with network management problems have included solutions at opposite extremes, namely (i) not modelling the layered network correctly (typically by omitting layers) and (ii) requiring the customer or network devices to provide much more information. The former approach has a deleterious effect on the ability of the network management system to fulfil its function. For example, network service fault correlation is impeded since the layered model is incomplete. The latter approach is impractical since customers or the network devices do not normally have access to the necessary data. Moreover, detailed knowledge of the network is required in advance and vast quantities of customer input is required. This necessitates a huge amount of data collection and continuous customer amendments with changes to the network. This is in addition to the undesirability of passing part of the burden of network management on to the customer, thereby diminishing the appeal of the network to the customer. These problems usually mean that there really is no viable alternative and network management of a multi-layered network is not viable.

SUMMARY OF THE INVENTION

In general terms, the present invention provides a method, a communication network and a network management system incorporating a technique by which management of the network is assisted, or in some instances made possible, by deriving information already available in certain layers/protocols of the network, for example from information above the server layers.

In a first aspect, the invention provides a communication network comprising a plurality of ports modelled according to a layer protocol, and a network management system adapted to store information describing the physical and logical resources within the network. The network management system comprises means responsive to information describing connectivity in a first one of the layers to derive further information concerning connectivity in another of the layers.

The invention also provides a method of managing a communication network comprising a plurality of ports modelled according to a layer protocol and a network management system adapted to store information describing the physical and logical resources within the network. The method comprises utilising information describing connectivity in a first one of the layers to derive further information concerning connectivity in another of the layers.

The invention further provides a network management system adapted to store information describing the physical and logical resources within a communication network comprising a plurality of ports modelled according to a layer protocol. The network management system comprises means responsive to information describing connectivity in a first one of the layers to derive further information concerning connectivity in another of the layers.

The invention yet further provides a method of operating such a network management system. In addition, the invention provides software enabling a computer to operate the above method and manage the above system and further provides storage media storing the software.

In all cases, the said first layer is preferably the closest known layer connectivity to the physical layer of the modelled communication network.

BRIEF DESCRIPTION OF THE DRAWINGS

The invention will now be described with reference to the drawings, in which:

FIG. 13 depicts a trail model scenario as an exemplary implementation of the invention;

FIG. 14 is a schematic illustration of the first step of the trail modelling scenario illustrating the present invention;

DETAILED DESCRIPTION OF THE ILLUSTRATED EMBODIMENTS

Figure 1:
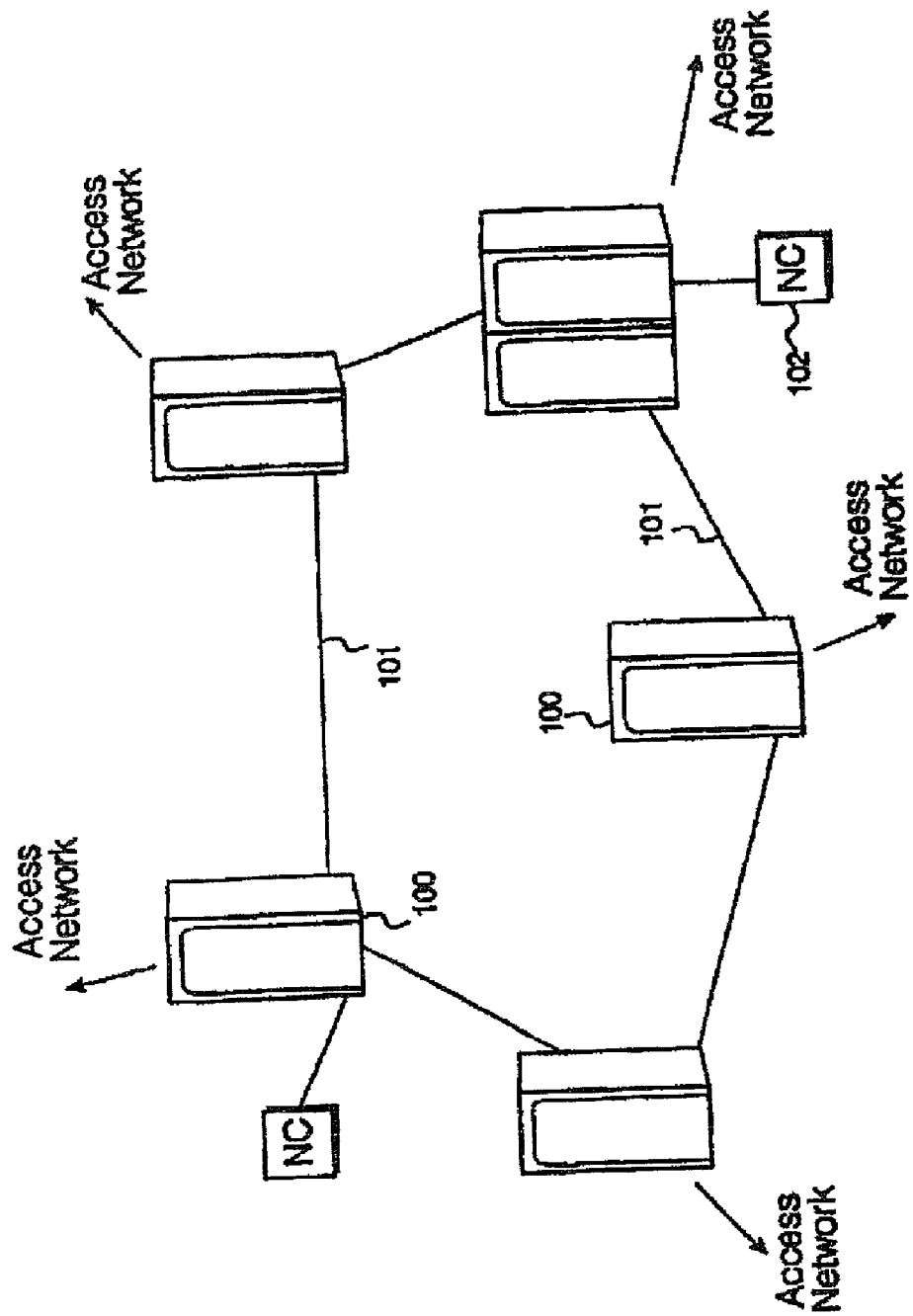
FIG. 1 is a generic representation of a communications network in which the present invention may operate.
Figure 2:
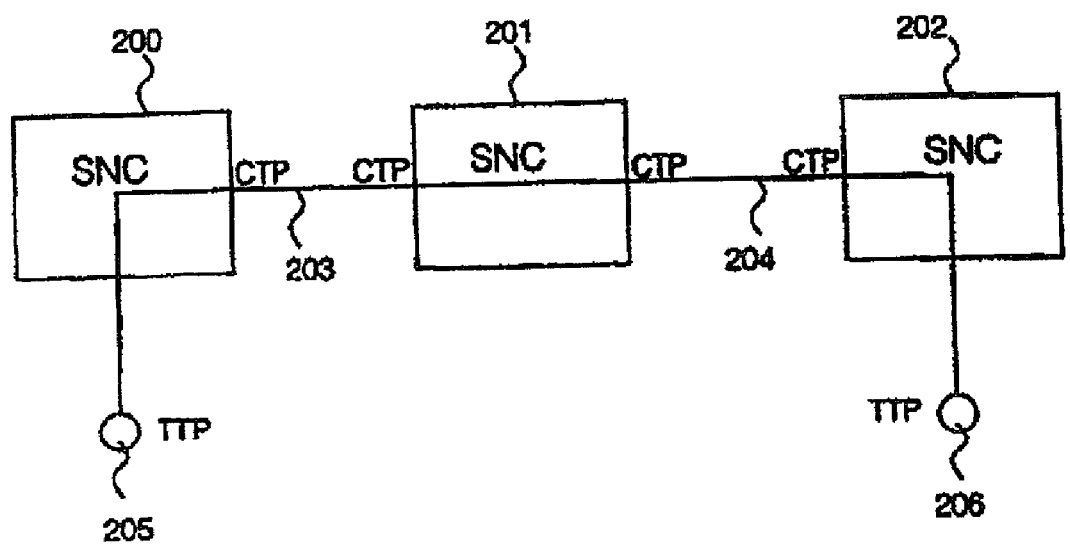
FIG. 2 is a simple example of a trail of a circuit switched communication over part of a communications transport network.
Figure 3:
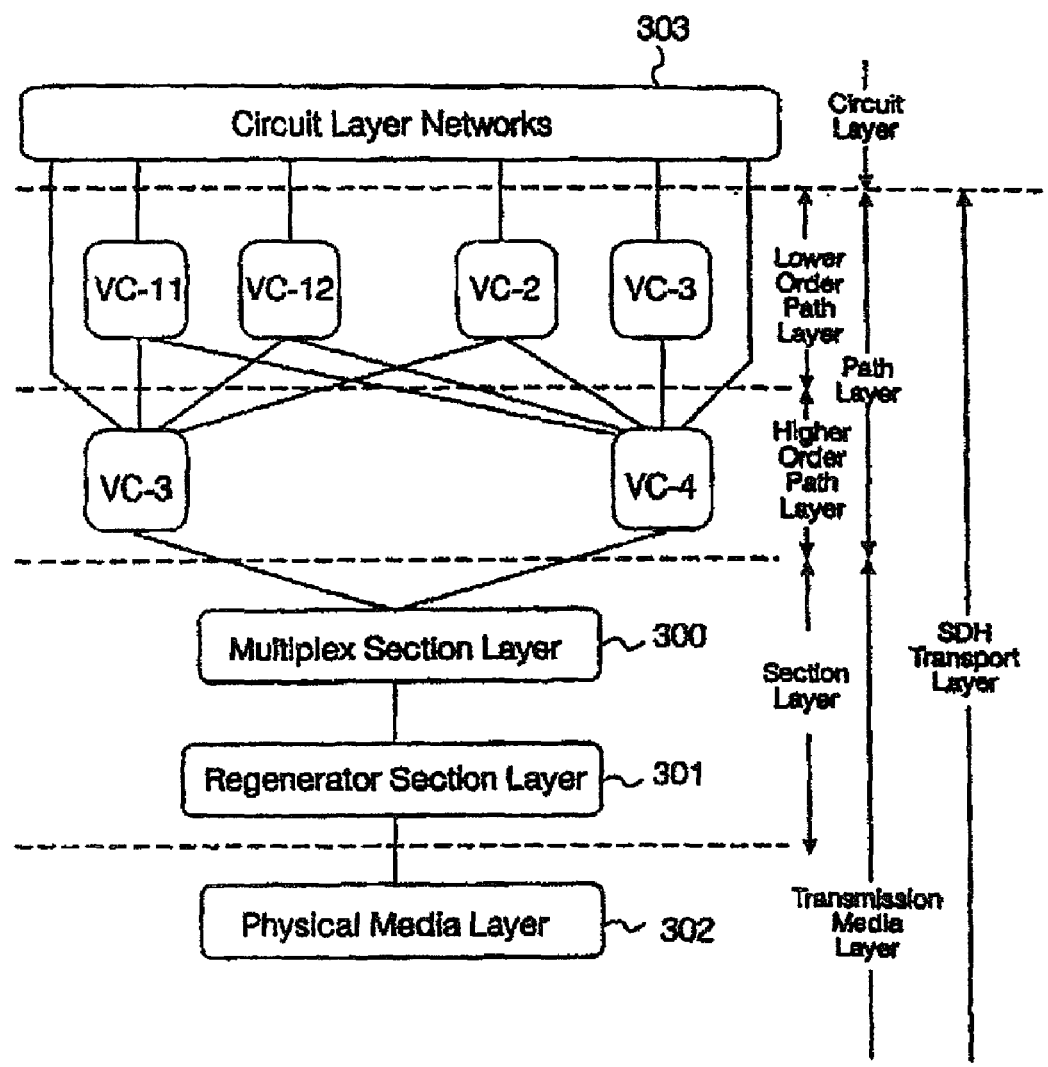
FIG. 3 illustrates an SDH based transport network layered model.
Figure 4:
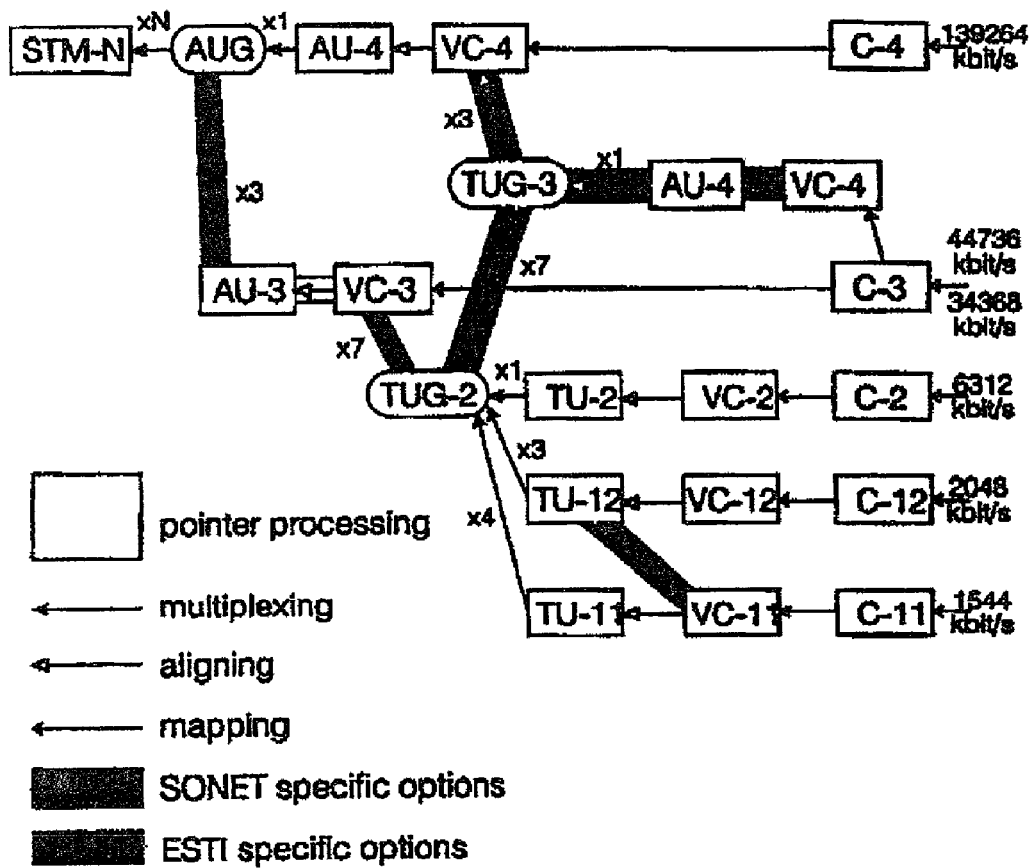
FIG. 4 illustrates an SDH multiplexing structure.
Figure 5:
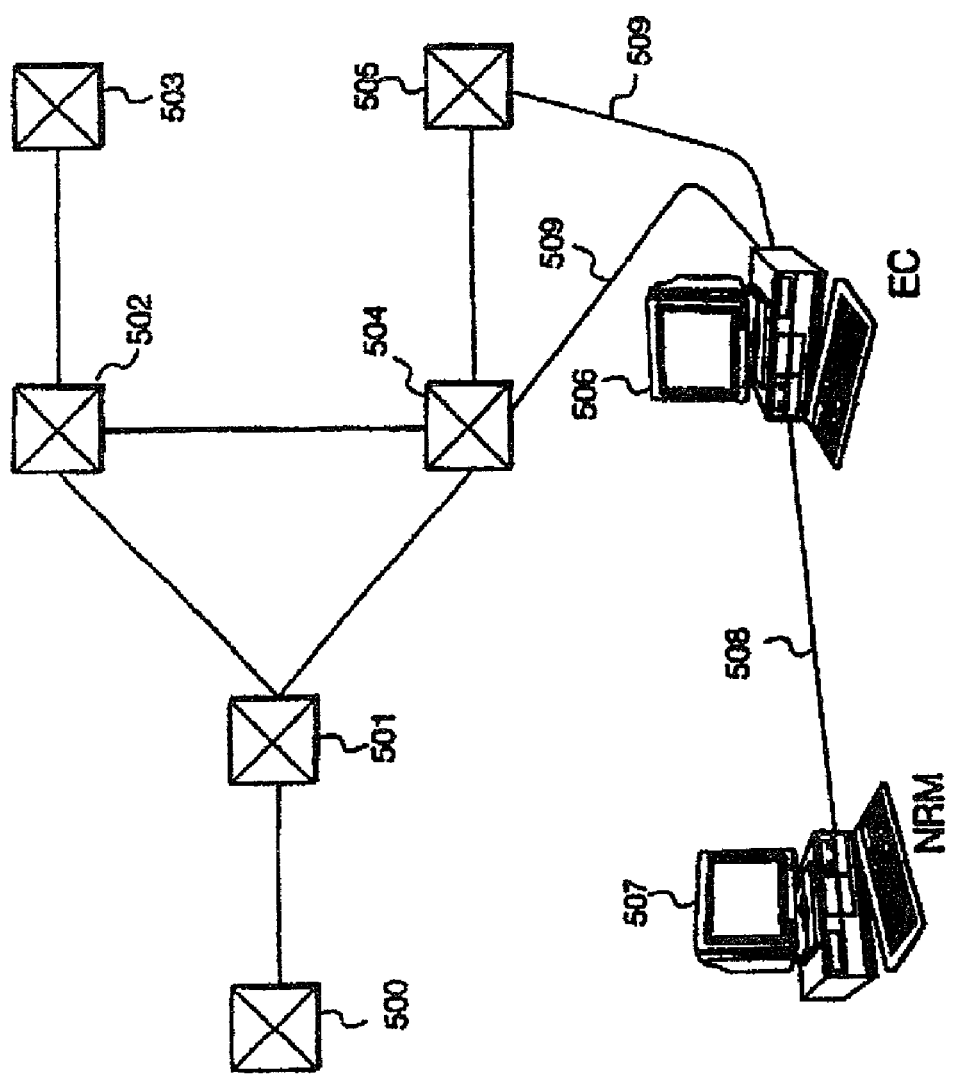
FIG. 5 illustrates schematically a section of an SDH communications network.
Figure 6:
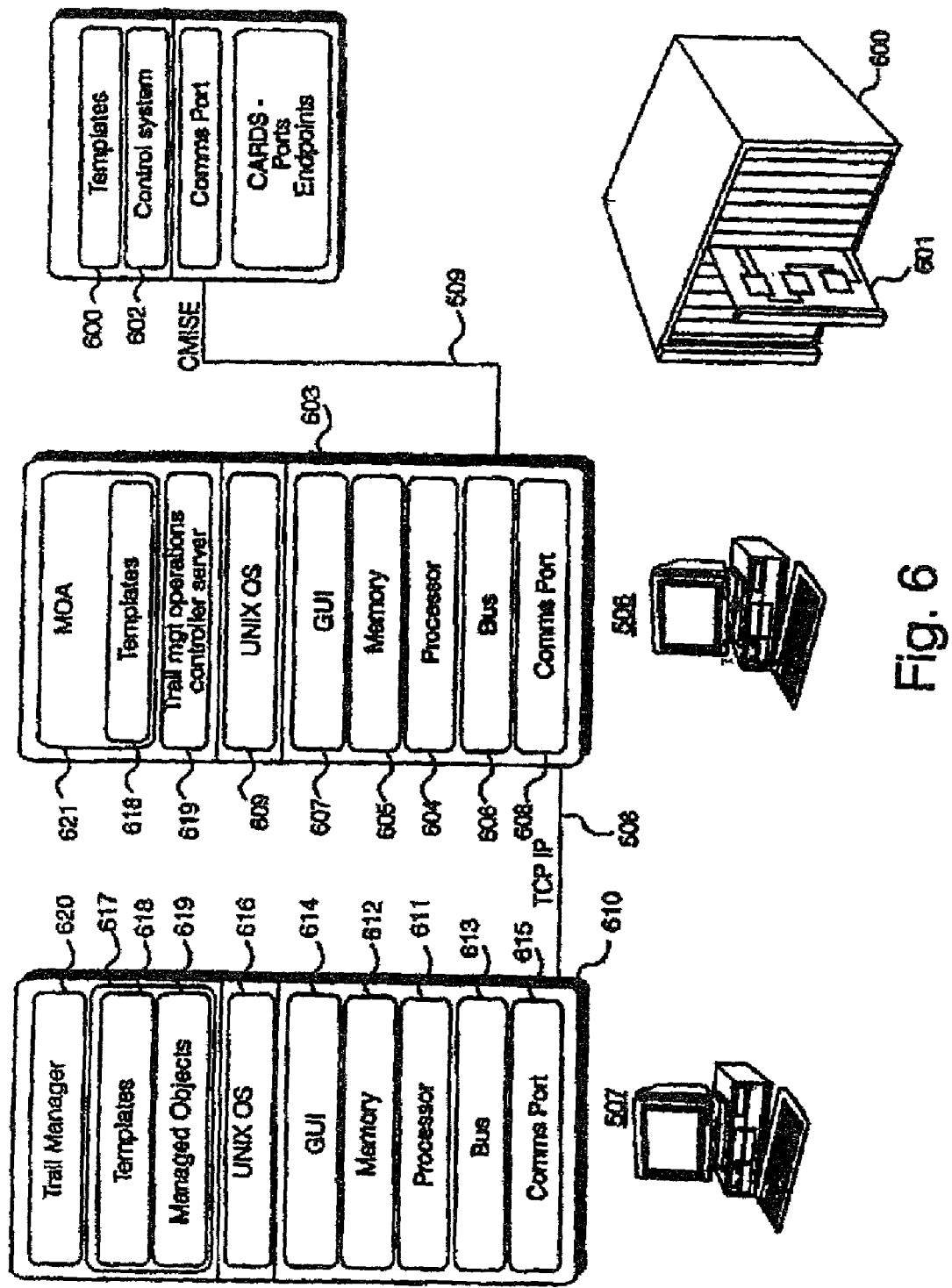
FIG. 6 illustrates schematically the construction of a typical network element.
Figure 7:
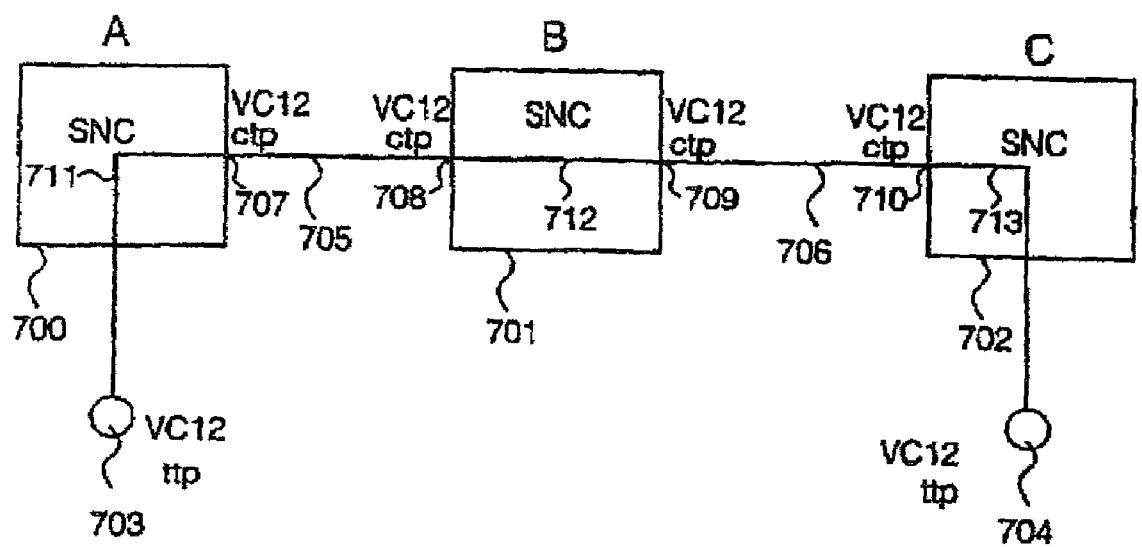
FIG. 7 illustrates schematically a trail across a plurality of network entities within a communication network as in FIG. 5.
Figure 8:
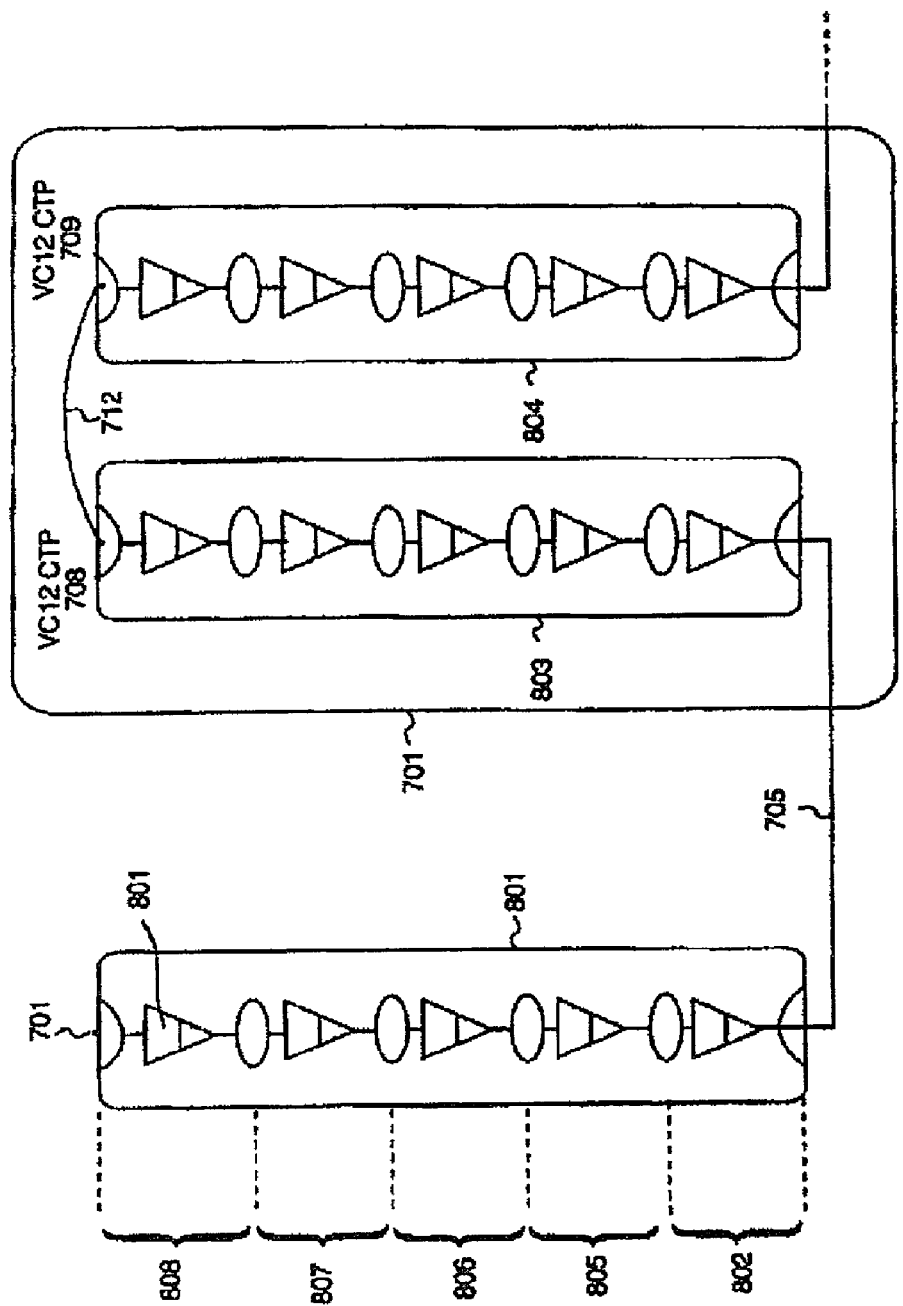
FIG. 8 illustrates schematically a plurality of ports comprising network elements in the network of FIG. 5.

In the following description of the best mode of implementing the invention, reference to the most common layer protocols outlined in the introduction will be made in the context of putting the invention into practice in a preferred mode, representing a particular approach to the network management solution.

In this approach, the invention enables a network management system modelling a communication network to derive trails, links and link connections present in the network at various layers/protocols from minimal information available to it. The invention incidentally also provides end-to-end compatibility checking which assists in the verification of connectivity validation.

In the exemplary communication network described above with reference to FIGS. 1 to 5, there are numerous layers of transmission at work, each ensuring transport of a particular characteristic information. This may typically be individual protocols. The connectivity within the communication network is numerous and complex. Moreover, there are many protocols involved.

Circumstances arise in which the network management system obtains information about the connectivity in one such layer/protocol. The invention permits this information to be used, in conjunction with knowledge of the function and capability of the equipment involved in the connectivity to derive much more connectivity information automatically, without the need for data collection and input by the customer or the network devices.

Consider, for example, the situation where a network port is connected to an optical fibre. Information concerning the connectivity of that port will be stored in the network management system. To be more specific, if the communication network is one that operates by maintaining a database of templates representing the connectivity of each and every port within the communication network, certain connectivity information will be represented in the template for that port.

Reference may be had to U.S. Pat. No. 6,223,219 for a detailed explanation of the template approach.

From the information stored in the template and from information concerning the equipment capability, further information concerning connectivity (eg trails, links, link connections) in the Optical Section (OS), Regeneration Section (RS), Multiplexer Section (MS), multiplexer section protection and partial High Order (HO) & LO path can be derived. The invention is not limited to these layers. For example, if the equipment is DWDM capable, the OTS, OMS, OCH and DSR layers can be similarly derived.

In one preferred method for deriving such further information, the network management system is provided with information concerning the function and capability of the ports/connections points and connectivity matrices of the equipment involved in connectivity. The network management system utilises this information to analyse the known connectivity and thereby to predict or infer network services that may be available in client layers and hence generate client links.

This capability information can further be used to understand what actually happens when a layered network is offered a network service, ie a link, by the server layer. This sometimes means that the intra-layer connectivity represented in the matrix corresponding to the device in question connects, terminates and adapts the offered signal in such a way that a further end-to-end transport is provided in the layered network.

This analysis continues recursively over the layer network. It can then "ripple" over and through a port/termination point and off to another connected device where the analysis continues to recurse. In this way, implied trails, links and link connections can be implied at potentially many client layers.

Referring now to the preferred mode or implementation of the invention, it will be recalled that each layer of a hierarchical network, such as G.805, represents a protocol, perhaps better described as a characteristic information. This representation has already been outlined in the introduction. In each layer, the trail termination point (TTP) extracts a header from data whereas the adaptation function "understands" what needs to be done with the content.

Figure 9:
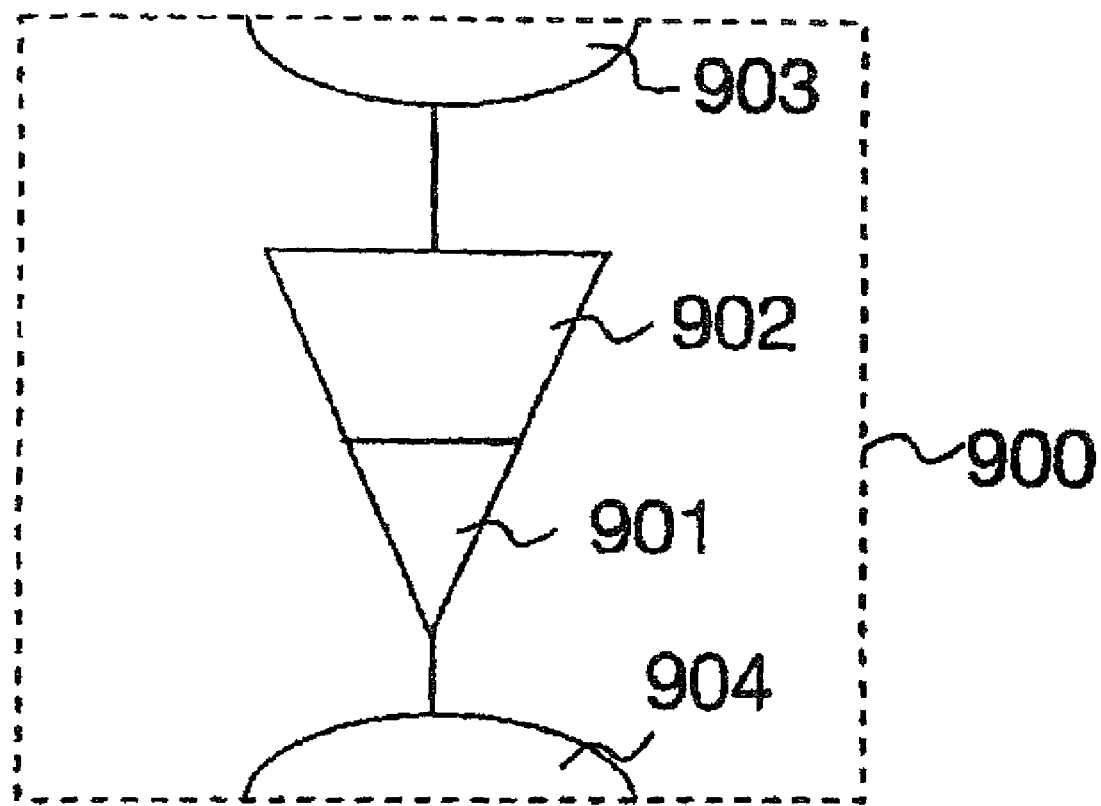
FIG. 9 illustrates schematically a data representation of a trail termination point and adaptation functionality corresponding to FIG. 8.
Figure 10:
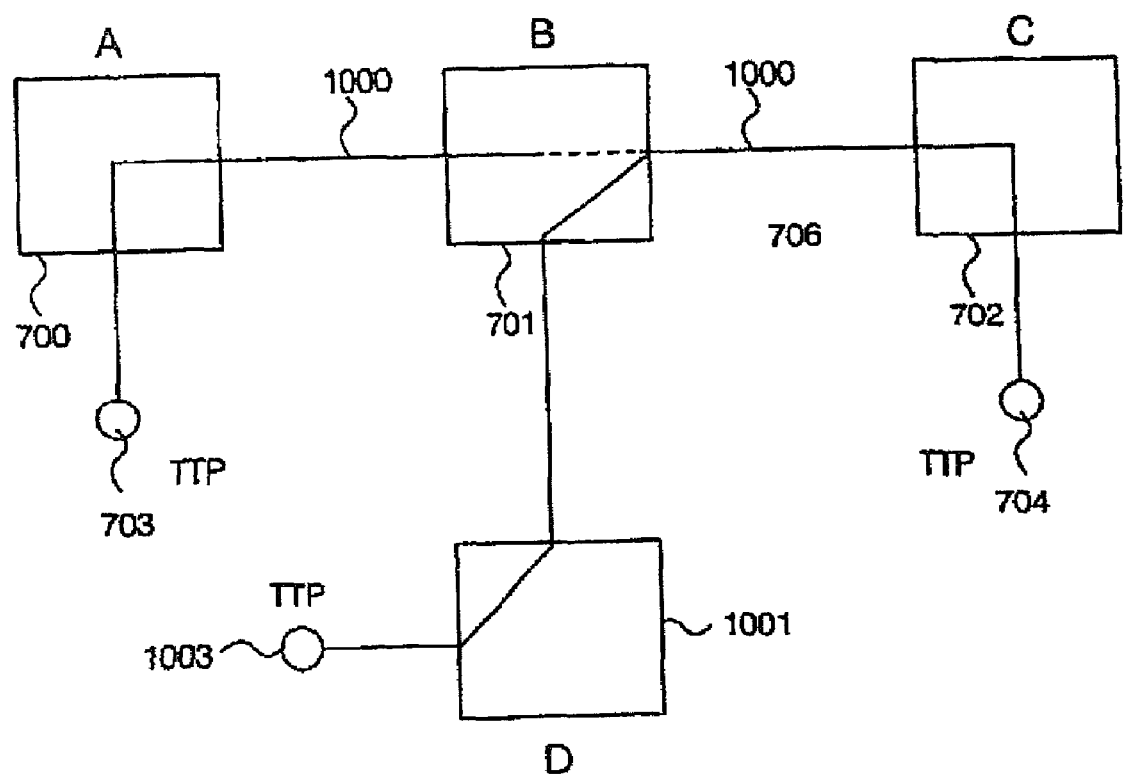
FIG. 10 illustrates schematically a planned trail and an actual trail within a communication network.
Figure 11:
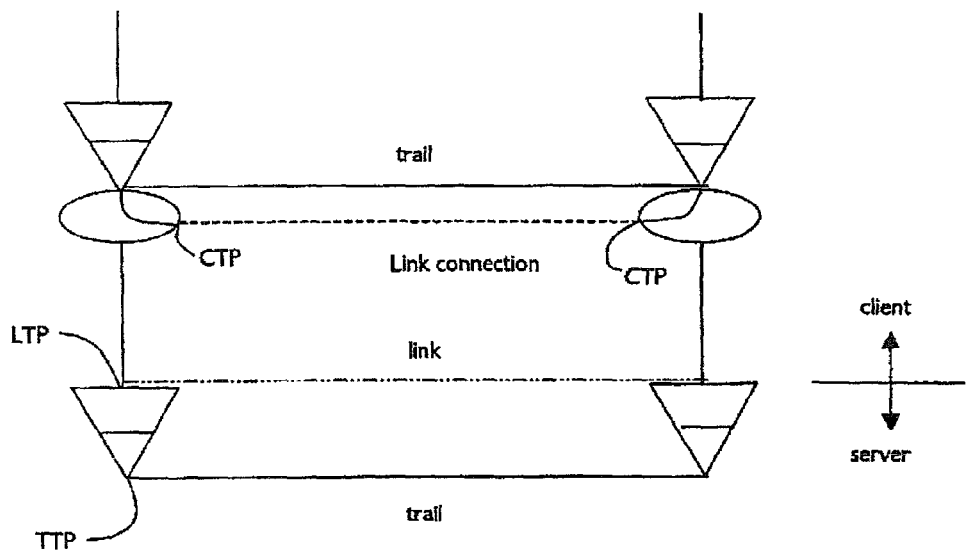
FIG. 11 is a schematic illustration of the levels of link, link connection and trail between network elements.
Figure 12:
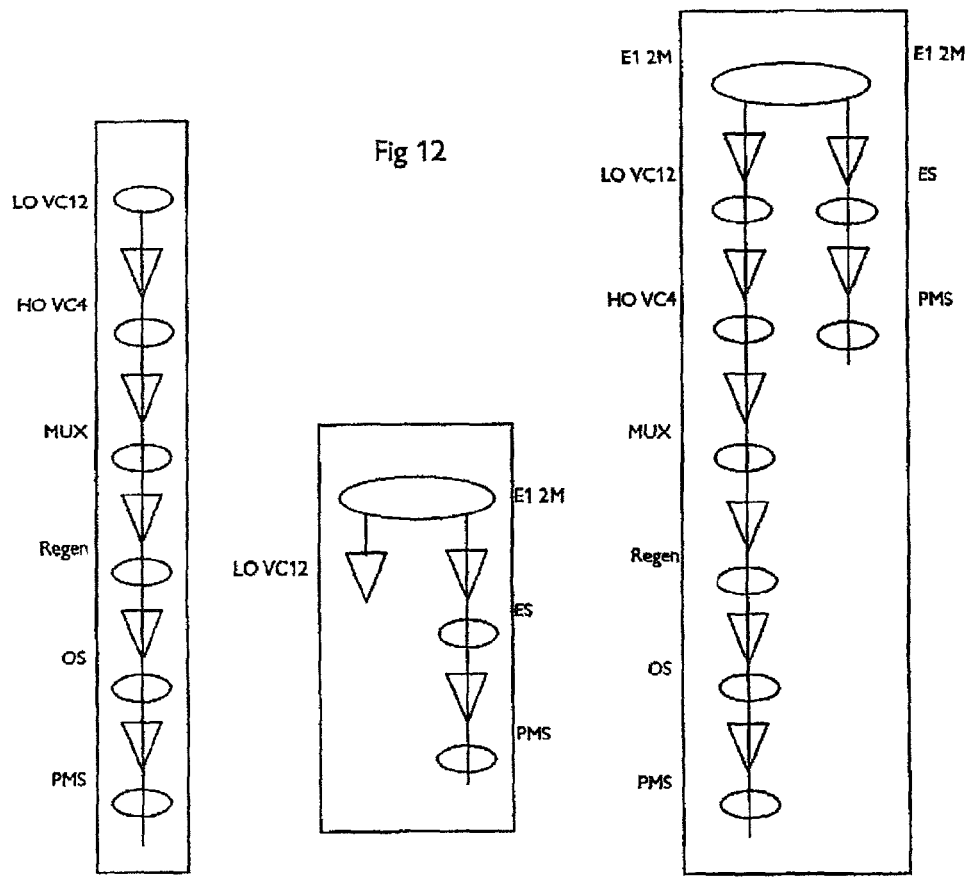
FIG. 12 is a schematic illustration of model packaging used in the present invention.

Consider then the situation illustrated in FIG. 12. At a certain instant in time, a trail may exist between the trail termination points of nodes or Network Elements (NEs) identified as A and B in the network. The link termination point for NEA is located immediately at the top of the adaptation part 902 of the model shown by FIG. 9. It defines the layer boundary between the server layer SL and the client layer CL. Trails are modelled between the TTPs of the ports or NEs. In similar manner, "links" are modelled between the link termination points (LTPs) at the layer boundary.

When a trail and a link have been established, a link connection LC is established between the connection termination points (CTPs) on the connection function 903 (FIG. 9) between different ports/NEs. The link is actually created by looking at the header(s) in the client overhead and allocating an appropriate link to represent capacity at the client layer. Where a client overhead contains more than one header, each with its own overhead, thereby implying more than one link, the link has capacity greater than one and each of these client capacities can be allocated to a link connection.

It is important to remember that, in hierarchical/topological modelling, the lower order client layer networks use transport services provided by underlying, higher order, server layer networks. Therefore, connectivity at a lower layer can only be supported by connectivity at a higher layer. Within a layer, a plurality of subnetworks can exist, the largest possible sub-network being the layer itself. When this situation exists, the sub-networks are interconnected by links. Links can be considered as representing the potential for bandwidth or the trail in the client layer.

The transport processing functions necessary to transport a signal across the network require the three aspects of adaptation, termination and connection, as shown previously in FIG. 9. (This figure is in fact a simplification of the G.805 model, which is otherwise identical except for the provision of an "access point" between the termination and adaptation functions.) It is worth noting that the adaptation function passes a collection of information between layer networks by changing the way in which the information is presented. In particular, it is responsible for:

Client encoding—adaptation source adapts a data stream into the server characteristics;

Client labelling—adaptation source labels each client so that the corresponding adaptation sink can correctly identify it (also enables multiplexing);

Client alignment—adaptation source aligns the client signal with the capacity in the server layer.

In general terms, the Trail Termination Function generates, adds and monitors information concerning the integrity and supervision of the adapted signal, whilst the Connection Function relays a collection of items of information between termination points. It does not modify the members of this collection of items of information, although it may terminate any switching protocol information and act upon it. The Connection Function is the same topological component as the Sub-network. Connections across the Function are Sub-network Connections.

The functions of the various termination points mentioned in the preceding paragraphs can be summarised as follows:

Trail termination point (TTP)—encapsulates a (G.805) termination connection point and a transport processing function that penetrates the characteristic information of a layer network and ensures the integrity of that characteristic information;

Link termination point (LTP)—represents the server layer TTP in the characteristics of the client layer encapsulating the server adaptation capacity in the form of CTP potential; and Connection termination point (CTP)—encapsulates a (G.805) connection point which is capable of transparently connecting the client characteristic information through a subnetwork connection (SNC) or a link connection.

Thus far, topological entities have been considered in the logical domain. However, they can be packaged together with their physical equipment counterparts. In this "model packaging" there are three transport equipment entity types that are key to the network solution, as follows:

Managed element (ME)—describes a discrete network entity having a set of monitored and/or controlled transport processing and support functions implemented by physical ports and matrix capabilities. It must be co-located and geographically inseparable;

Endpoint—describes the location and existence of a physical or (rarely) logical or port pair; and Managed Object Agent (MOA)—acts as the network management contact point for information about the physical and logical resources within its domain of control.

Network elements (NEs) contain endpoints representing physical ports, each of which has a logical presence in a number of layer network domains and subnetworks. FIG. 12 represents an optical port package, a 2M tributary port and a 2M tributary port cross-connected to an STM-1 optical port using the LO VC-12 layer.

For the purposes of the present embodiment of the invention, the two tributary ports are of significance. In each case, the connection function represented by the ellipse at the top of each port indicates connection into another port to a different subnetwork via a trail/link.

The Figure illustrates how the network elements contain endpoints representing physical ports, each of which has a logical presence in a number of layer network domains and sub-networks. Each template of the connection, adaptation and termination functions has rules governing the manner in which connections and functions can legally be made. Thus, in the client layer, there will be client connection rules associated with the connection function. Similarly, there will be TTP rules governing trail termination point connection.

For example, consider the situation where a TTP template might represent a VC4 layer TTP that is restricted by hardware limitations to produce only VC3 and VC12 but not VC11. The adaptation rules would then explicitly state the adaptation capability and would identify only VC3 and VC12. Each time a TTP with these properties was "installed" in an NE, a message identifying the TTP template would be issued by the EC. There will not normally be a large number of templates required because vendors usually have a restricted variety of TTPs in their portfolio.

Consider now a scenario in which it is required to model a real network in which Network elements A and C are to be connected through network element B, as illustrated schematically in FIG. 13. When a trail is being laid, the first operation is to define the physical connectivity between ports. As can be seen in FIG. 14, the trails, links and link connections work their way up the hierarchy from the physical layer PMS according to the connection rules. In this particular case, the "must connect" rule causes auto client propagation up the hierarchy until the first flexible layer (VC4) is reached.

Figure 15:
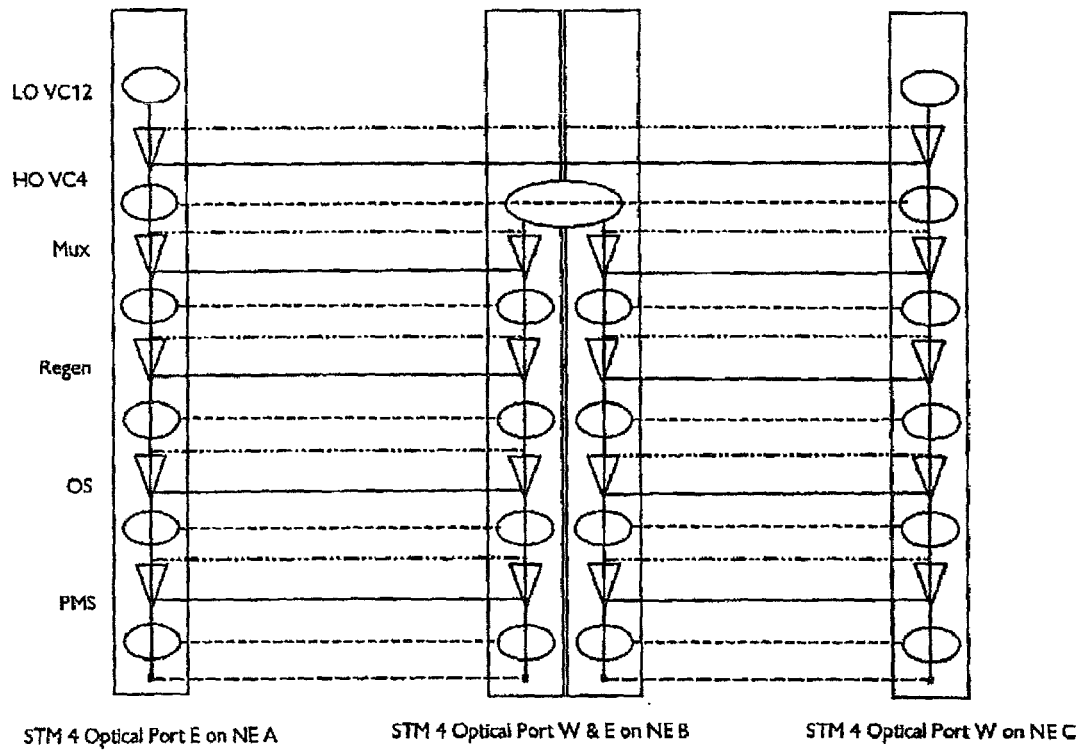
FIG. 15 is a schematic illustration of the second step of the trail modelling scenario illustrating the present invention.

At this point, the VC4 connectivity between NEA and NEC is defined, as represented in FIG. 15. In this particular scenario, NEB is assumed to contain a passthrough CTP-CTP SNC, whilst NEA and NEC terminate the VC4.

Figure 16:
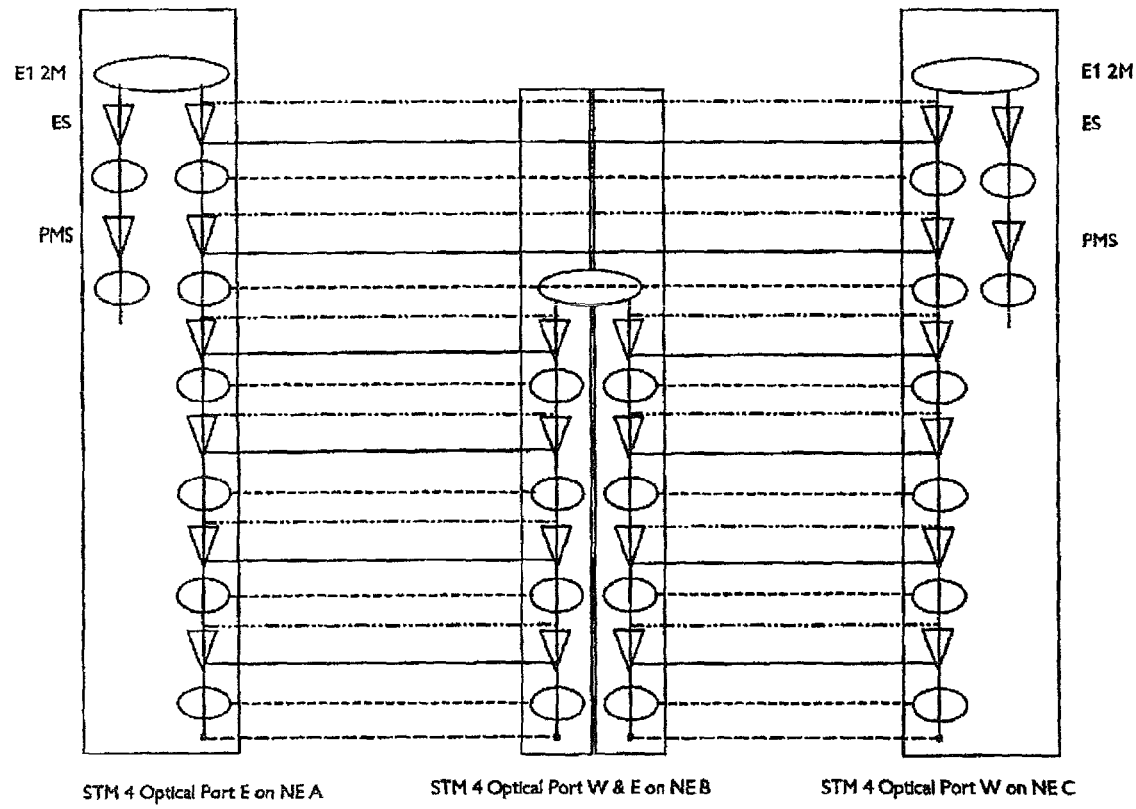
FIG. 16 is a schematic illustration of the third step of the trail modelling scenario illustrating the present invention.

In the final step, illustrated schematically in FIG. 16, the LO VC12 trail is established between NEA and NEC. By having built upwards in this way from the physical connectivity to the Virtual Container layers, connection to other subnetworks becomes modelled and the trail is complete. It can therefore be seen that in the method, the trail "ripples" up the hierarchy.

An example of pseudocode to enable the invention to be achieved would include the following:

```
Build a link from the information supplied
Point A:
For each possible channel on the link,
    Create an empty trail route structure
    For each end on the link,
        Follow the MustConnect connection rules/existing connections
                                and underlying links,
                    inserting the details into the trail route
                    structure, until a trail end is found
    If the trail route structure describes a complete trail
        Build the trail using the route
        Build client links on the trail using the intersection of
                                capabilities of all the trail ends
            For each link built, recurse to point A
```

We claim:

1. A communications network comprising
   a plurality of ports modelled according to a layer protocol, and
   a network management system adapted to store information describing the physical and logical resources within the network,
   wherein the network management system is responsive to information describing connectivity of ports in a first one of layers of the layer protocol to derive further information concerning connectivity of ports in another of the layers,
   and wherein the network management system uses information concerning connectivity in the layer protocol, in conjunction with information describing the physical and logical resources within the network, to predict or infer network services available in client layers.

2. A communications network as claimed in claim 1, wherein said first layer is the closest known layer connectivity to the physical layer of the layer protocol.

3. A communications network as claimed in claim 2, wherein said network management system is adapted to derive further information in a plurality of successive layers of the layer protocol.

4. A method of managing a communications network, the network comprising a plurality of ports modelled according to a layer protocol and a network management system adapted to store information describing the physical and logical resources within the network, the method comprising the steps of
   obtaining information describing connectivity of ports in a first one of layers of the layer protocol;
   deriving further information concerning connectivity of ports in another of the layers; and
   using information concerning connectivity in the layer protocol, in conjunction with information describing the physical and logical resources within the network, to predict or infer network services available in client layers.

5. A method according to claim 4, wherein the step of obtaining information describing connectivity in the first one of the layers is performed in the closest known layer connectivity to a physical layer of the layer protocol.

6. A method according to claim 4, wherein the step of deriving information concerning connectivity of ports at another of the layers derives information concerning the connectivity of ports of a plurality of the other layers.

7. A communications network management system having a store arranged to store information describing the physical and logical resources within a communications network, the network comprising a plurality of ports modelled according to a layer protocol,
   wherein the network management system is responsive to information describing connectivity of ports in a first one of layers of the layer protocol to derive further information concerning connectivity of ports in another of the layers,
   and wherein the network management system uses information concerning connectivity in the layer protocol, in conjunction with information describing the physical and logical resources within the network, to predict or infer network services available in client layers.

8. A communications network management system according to claim 7, wherein said first layer is the closest known layer connectivity to a physical layer of the layer protocol.

9. A communications network management system according to claim 7, further arranged to derive said further information for a plurality of other layers of the layer protocol.

10. A method of operating a communications network management system adapted to store information describing the physical and logical resources within a communications network, the network comprising a plurality of ports modelled according to a layer protocol, the method comprising the steps of
    obtaining information describing connectivity of ports in a first one of layers of the layer protocol;
    deriving further information concerning connectivity of ports in another of the layers; and
    using information concerning connectivity in the layer protocol, in conjunction with information describing the physical and logical resources within the network, to predict or infer network services available in client layers.

11. A method according to claim 10, wherein the step of obtaining information describing connectivity of ports in the first one of the layers is performed in the closest known layer connectivity to a physical layer of the layer protocol.

12. A method according to claim 10, wherein the step of deriving information concerning connectivity of ports at another of the layers derives information concerning the connectivity of ports of a plurality of the other layers.

13. A computer readable media storing program code enabling a computer to perform the method of managing a communications network, the network comprising a plurality of ports modelled according to a layer protocol and a network management system adapted to store information describing the physical and logical resources within the network, the method comprising the steps of:
- obtaining information describing connectivity of ports in a first one of layers of the layer protocol;
- deriving further information concerning connectivity of ports in another of the layers; and
- using information concerning connectivity in the layer protocol, in conjunction with information describing the physical and logical resources within the network, to predict or infer network services available in client layers.

14. A computer readable media storing program code enabling a computer to perform the method of operating a communications network management system adapted to store information describing the physical and logical resources within a communications network, the network comprising a plurality of ports modelled according to a layer protocol, the method comprising the steps of:
- obtaining information describing connectivity of ports in a first one of layers of the layer protocol;
- deriving further information concerning connectivity of ports in another of the layers, and
- using information concerning connectivity in the layer protocol, in conjunction with stored information describing the physical and logical resources within the network, to predict or infer network services available in client layers.

15. A computer program product comprising a computer readable media storing program code which, when run on a computer, causes the computer to perform the method of managing a communications network, the network comprising a plurality of ports modelled according to a layer protocol and a network management system adapted to store information describing the physical and logical resources within the network, the method comprising the steps of:
- obtaining information describing connectivity of ports in a first one of layers of the layer protocol;
- deriving further information concerning connectivity of ports in another of the layers; and
- using information concerning connectivity in the layer protocol, in conjunction with information describing the physical and logical resources within the network, to predict or infer network services available in client layers.

16. A computer program product comprising a computer readable media storing program code which, when run on a computer, causes the computer to perform the method of operating a communications network management system adapted to store information describing the physical and logical resources within a communications network, the network comprising a plurality of ports modelled according to a layer protocol, the method comprising the steps of:
- obtaining information describing connectivity of ports in a first one of layers of the layer protocol;
- deriving further information concerning connectivity of ports in another of the layers; and
- using information concerning connectivity in the layer protocol, in conjunction with information describing the physical and logical resources within the network, to predict or infer network services available in client layers.

17. A computer comprising a processing unit programmed to perform a method of managing a communications network, the network comprising a plurality of ports modelled according to a layer protocol and a network management system adapted to store information describing the physical and logical resources within the network, the method comprising the steps of:
- obtaining information describing connectivity of ports in a first one of layers of the layer protocol;
- deriving further information concerning connectivity of ports in another of the layers; and
- using information concerning connectivity in the layer protocol, in conjunction with information describing the physical and logical resources within the network, to predict or infer network services available in client layers.

18. A computer comprising a processing unit programmed to perform a method of operating a communications network management system adapted to store information describing the physical and logical resources within a communications network, the network comprising a plurality of ports modelled according to a layer protocol, the method comprising the steps of:
- obtaining information describing connectivity of ports in a first one of layers of the layer protocol;
- deriving further information concerning connectivity of ports in another of the layers; and
- using information concerning connectivity in the layer protocol, in conjunction with information describing the physical and logical resources within the network, to predict or infer network services available in client layers.

* * * * *